May 19, 1942.   J. T. NORTON   2,283,453
TORSION PENDULUM DAMPING APPARATUS
Filed Oct. 14, 1939
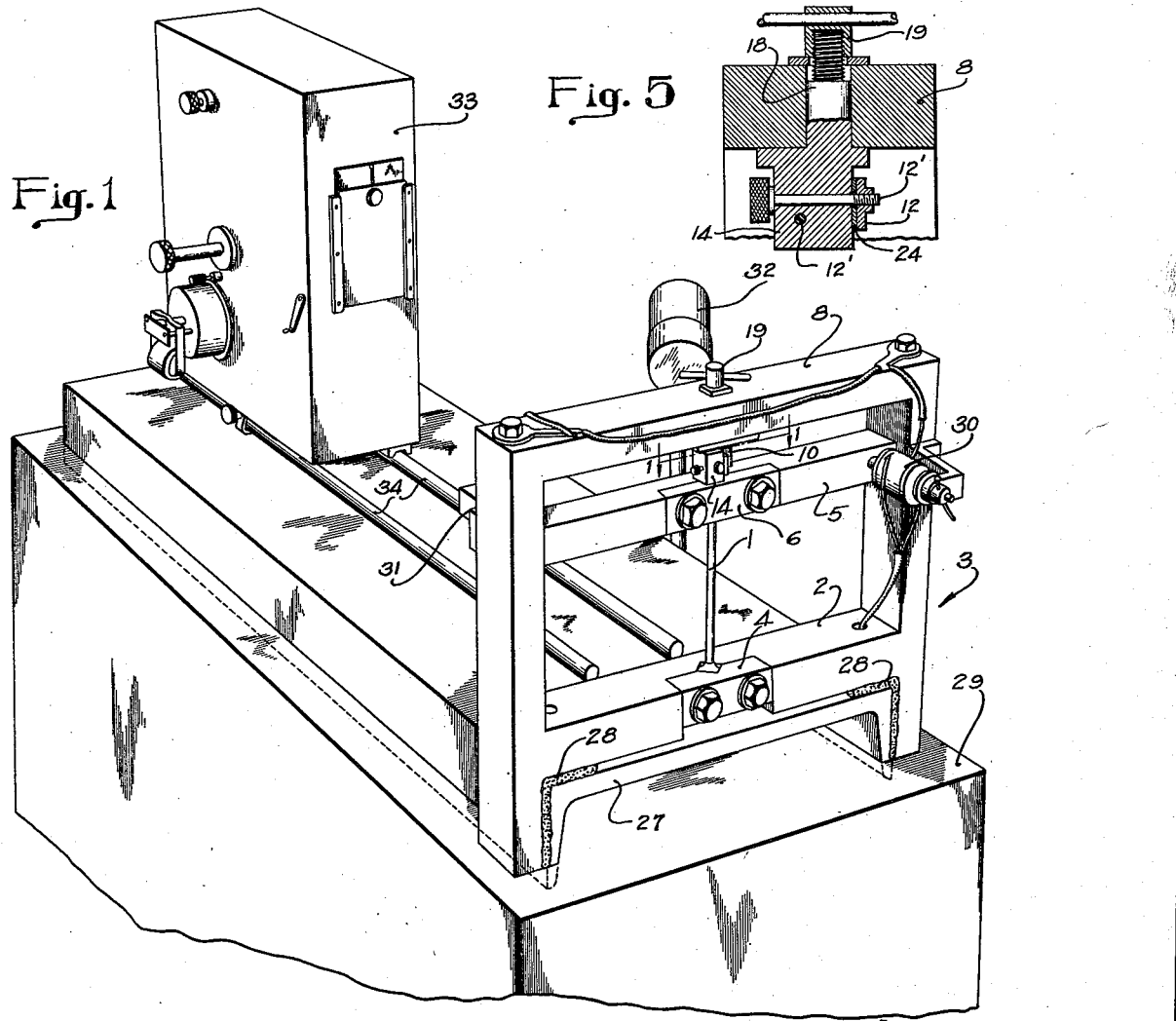
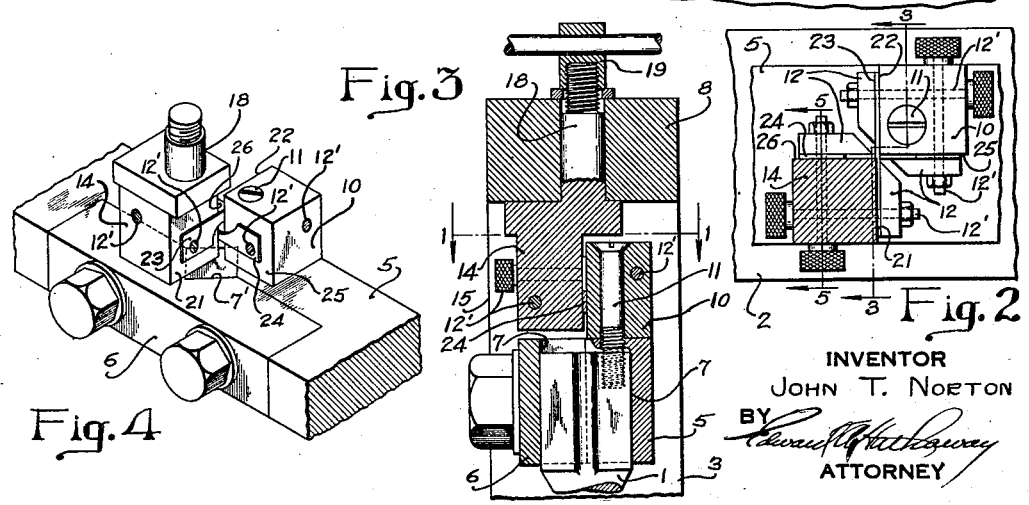
INVENTOR
JOHN T. NORTON
BY
ATTORNEY Patented May 19, 1942

2,283,453

UNITED STATES PATENT OFFICE 2,283,453

TORSION PENDULUM DAMPING APPARATUS

John T. Norton, Cambridge, Mass.

Application October 14, 1939, Serial No. 299,543

8 Claims. (Cl. 73—51)

This invention relates generally to materials testing apparatus and more particularly to a torsion pendulum instrument for measuring internal friction of materials.

The measurement of internal friction or damping capacity in metals has long been known to be a desirable field of investigation because such measurement has proved to be extraordinarily sensitive to certain types of structural changes.

Various types of torsion damping machines have been used heretofore although their structural arrangements have been deficient either because of their inability to obtain certain desirable results or because of being predicated upon what I believe to be fallacious theories. I believe that an unnecessary amount of attention and precaution have been heretofore attached to the possible loss of energy from the instrument structure to its surroundings with the result that these precautions either introduced other undesirable characteristics or rendered it difficult to obtain accurate measurements with facility.

It is an object of my invention to provide an improved instrument that will permit rapid comparative measurements to be taken on specimens of reasonable size over a considerable range of strains and at the same time keep down energy losses in the instrument to a sufficiently low value so as to permit observation of small differences between specimens of low damping with a fair degree of precision.

It is another object of my invention to provide an improved instrument that is relatively simple, rugged and positive in operation while at the same time having the necessary precision qualities of scientific apparatus whereby energy losses in the instrument are kept to a negligible value.

Other objects and advantages will be more apparent to those skilled in the art from the following description of the accompanying drawing in which:

Fig. 1 is a perspective of my improved apparatus;

Fig. 2 is a horizontal section taken substantially on the line 1—1 of Figs. 1 and 3;

Fig. 3 is a partial longitudinal vertical section taken substantially on the line 3—3 of Fig. 2;

Fig. 4 is a perspective of the central portion of the inertia bar showing the manner in which the bar is positively pivotally supported without friction;

Fig. 5 is a section taken substantially on the line 5—5 of Fig. 2 but omitting for purposes of simplicity the inertia bar and one of the fulcrum supporting blocks.

In the specific embodiment of the invention illustrated herein the torsion pendulum consists of a cylindrical specimen 1 clamped at its lower end in a cross member 2 of an integral rigid frame generally indicated at 3. A removably bolted element 4 fits within a suitable recess within cross member 2 to firmly clamp the specimen whose upper end is clamped to an inertia bar 5 by a similar removably bolted clamping element 6. The specimen ends may have any suitable shape necessary to be tightly held although the specific shape of the specimen ends and clamping sockets 7 are shown herein as being square disposed on the diagonal as shown at 7', Fig. 4.

The inertia bar is positively pivotally guided in a frictionless manner by a connection with an upper cross member 8 of the frame 3. This frictionless support comprises a block 10, Figs. 3 and 4, suitably rigidly secured by a screw 11 to inertia bar 5. A similar block 14 is formed preferably integrally with an upwardly projecting clamping stud 18 extending through cross frame member 8 and securely held in position by a clamping nut 19. The stud and block 14 are removable. As clearly shown in Figs. 2 and 4, the blocks 10 and 14 are diagonally disposed with respect to each other and are respectively offset with respect to the vertical axis of oscillation of the inertia bar. As a result of this arrangement, faces 21 and 22 of the two blocks are substantially in alignment with each other but slightly spaced apart about 3/1000 inch thereby permitting a flexible steel ribbon or flexure plate 23 to be clamped or otherwise suitably secured to the faces 21 and 22 to positively connect the same together. A similar ribbon flexure plate 24 is secured to the aligned faces such as 25 and 26 of blocks 10 and 14. Both of these flexure plates are about 3/1000 inch thick and 1/16 inch high and they are vertically cut away along opposed arcuate lines at their point of cross over as shown in Fig. 4. As shown in Figs. 2 and 5 the flexure plates are clamped to their blocks 10 and 14 by clamping plates 12 held by a series of screws 12' extending through the blocks in offset relation to each other. The clamping plates 12 are omitted from Fig. 4 for purposes of clarity. The point of cross over of the two flexure plates falls within the vertical axis of oscillation of the specimen and inertia bar 5. As a result of this arrangement, a positive guide is provided for the upper pivotal end of the specimen and inertia bar, and yet due to the extremely thin character of the flexure elements no friction is introduced.

The frame 3 with its two opposed supporting members 2 and 8 is, in effect, only one component part of a larger and more substantial frame structure consisting of an inverted structural channel member 27 to which frame 3 is suitably welded at its two corners 28. A large concrete block 29 is poured around the lower ends of the flanges of channel 27 thereby causing the channel and block to be a rigid unit. The mass of the three frame components 3, 27 and 29 is so enormous in comparison to the mass of the inertia bar and the moment of inertia of the horizontally elongated channel and concrete base is so large that it has been found from actual experience that no measurable quantity of energy is lost during a damping test. The horizontal elongation of the channel and base is particularly advantageous in making the moment of inertia as large as possible and thus reduce its tendency to move. Furthermore, the positive but flexible and frictionless pivotal guiding members 23 and 24 insure complete freedom from vibration of inertia bar during its oscillations thereby eliminating another possible source of energy loss.

In the operation of a device of this kind, when the specimen 1 is initially placed in the instrument without being under the influence of any torsional stress, the inertia bar 5 will be in some predetermined angular position. To subject the specimen to torsion the inertia bar 5 is then rotated to its transverse position shown in Fig. 1 and is held in that position preferably by a pair of electro-magnets generally located at 30 and 31 so as to magnetically hold the opposite ends and opposite sides of the inertia bar 5. The bar may be released by suitably breaking the circuit for the electro-magnets but further detailed description of such apparatus is not necessary because it does not constitute per se a part of my invention. Upon release of the inertia bar it will oscillate under the influence of the elastic energy stored up in the specimen thereby subjecting specimen 1 to alternate torsional stresses. The damping characteristics of the specimen material itself will ultimately bring the inertia bar to rest.

To record the damping action I employ a usual recording camera arrangement consisting of a source of light 32 directed against a suitable mirror on the inertia bar 5 so as to reflect light back to a recording camera 33 which is longitudinally adjustably supported on a suitable trackway 34. The decrement curve of the damping action is made on any suitable photographic paper such as electro-cardiograph paper driven in any usual manner by a synchronous electric motor.

My improved frame and inertia bar arrangement permits camera recording to be made in a simple, direct and highly accurate manner and at the same time my improved frame avoids loss of energy in the stationary frame and avoids any vibratory losses at the upper moving end of the specimen.

It will of course be understood that various changes in details of construction and arrangement of parts may be made by those skilled in the art without departing from the spirit of the invention as set forth in the appended claims.

I claim:

1. A torsion pendulum damping apparatus comprising, in combination, a stationary integrally formed base and frame of large mass and having opposed cross members, an inertia bar of very small mass compared to the mass of said base and frame, means for clamping one end of a specimen by one of said opposed members and the other end by said inertia bar whereby upon oscillation of said bar an alternating torsional stress is imparted to the specimen while at the same time the large integral mass of the base and frame operates to prevent loss of inertia bar energy in said base and frame, and means for pivotally supporting said inertia bar and specimen by the other of said opposed members.

2. The combination set forth in claim 1 further characterized in that said pivotal supporting means has provision for being removably connected to its cross member.

3. The combination set forth in claim 1 further characterized in that said pivotal supporting means includes a flexible member connected to said inertia bar and to said frame.

4. The combination set forth in claim 1 further characterized in that said pivotal supporting means includes a pair of crossed flexible members connected to said inertia bar and to said frame, said flexible members crossing each other on a line containing the specimen axis.

5. A torsion pendulum damping apparatus comprising, in combination, a frame having one component part extending vertically and adapted to support a torsion specimen, and another component part comprising a base of large moment of inertia rigidly connected to said vertical part to form a unitary structure of large mass, an inertia bar of very small mass compared to the mass of said base, said bar being disposed adjacent the upper end of said vertical frame part, means for freely pivotally connecting said inertia bar to said vertical frame at the upper end thereof, means for rigidly securing a torsion specimen to said bar, and means for rigidly securing the specimen to said vertical frame at the lower portion thereof adjacent said base whereby the inertia bar may subject a specimen to a torsional stress while at the same time the large integral mass of said unitary structure acts directly on the lower end of the specimen to prevent loss of inertia bar energy in said base and frame.

6. The combination set forth in claim 5 further characterized in that the base includes a horizontally elongated structural channel having a horizontal web and flanges extending downwardly therefrom, said base also including a concrete member in which said flanges are firmly embedded while said horizontal web remains exposed to form an instrument supporting surface on the top of the base.

7. The combination set forth in claim 5 further characterized in that said base includes a horizontal member, and a normally fixed camera for recording oscillations of said inertia bar is longitudinally adjustably supported on said horizontal member.

8. The combination set forth in claim 5 further characterized in that said base member is horizontally elongated and said vertical frame is supported on said elongated member at one end thereof whereby said base has an inertia moment arm of considerable magnitude to augment the inertia of the base mass.

JOHN T. NORTON.